United States Patent [19]

Rennhard

[11] 3,876,794
[45] Apr. 8, 1975

[54] DIETETIC FOODS
[75] Inventor: Hans H. Rennhard, Lyme, Conn.
[73] Assignee: Pfizer Inc., New York, N.Y.
[22] Filed: Mar. 14, 1974
[21] Appl. No.: 451,090

Related U.S. Application Data

[60] Continuation-in-part of Ser. No. 317,004, Dec. 20, 1972, abandoned, which is a division of Ser. No. 257,001, May 25, 1972, Pat. No. 3,766,165, which is a continuation-in-part of Ser. No. 116,610, Feb. 18, 1971, abandoned, which is a continuation of Ser. No. 794,476, Jan. 22, 1969, abandoned, which is a continuation-in-part of Ser. No. 572,921, Aug. 17, 1966, abandoned.

[52] U.S. Cl. ............... 426/152; 426/163; 426/164; 426/168; 426/171; 426/190; 426/201; 426/214; 426/217; 426/213
[51] Int. Cl. .............................................. A23l 1/26
[58] Field of Search ............. 426/3, 6, 19, 152, 155, 426/157, 158, 163, 167, 168, 171, 185, 190, 201, 203, 208, 212, 213, 215, 217, 380, 214; 260/209 R

[56] References Cited
UNITED STATES PATENTS

| | | | |
|---|---|---|---|
| 2,876,104 | 3/1959 | Bliudzius et al. | 426/214 X |
| 2,876,105 | 3/1959 | Jucaitis et al. | 426/213 |
| 2,876,106 | 3/1959 | Jucaitis et al. | 426/214 |
| 3,023,104 | 2/1962 | Battista | 426/171 X |
| 3,676,150 | 7/1972 | Glicksman et al. | 426/19 X |
| 3,766,165 | 10/1973 | Rennhard | 260/209 R |
| 3,767,423 | 10/1973 | Tsantir et al. | 426/152 X |

Primary Examiner—A. Louis Monacell
Assistant Examiner—Esther L. Massung
Attorney, Agent, or Firm—Connolly and Hutz

[57] ABSTRACT

Non-nutritive carbohydrate substitutes are prepared by polycondensation of saccharides in the presence of polycarboxylic acid catalyst at reduced pressure and are useful in dietetic food compositions.

18 Claims, No Drawings

DIETETIC FOODS

CROSS REFERENCE TO RELATED APPLICATIONS

The subject application is a continuation-in-part of copending application Ser. No. 317,004, filed Dec. 20, 1972, now abandoned which in turn is a division of application Ser. No. 257,001, filed May 25, 1972, now U.S. Pat. No. 3,766,165, which in turn is a continuation-in-part of application Ser. No. 116,610, filed Feb. 18, 1971, and now abandoned, said application Ser. No. 116,610 in turn being a continuation of application Ser. No. 794,476, filed Jan. 22, 1969, and now abandoned, said application Ser. No. 794,476 in turn being a continuation-in-part of application Ser. No. 572,921, filed Aug. 17, 1966, and now abandoned.

BACKGROUND OF THE INVENTION

This invention relates to novel carbohydrate materials derived from glucose and to processes for preparing the same. More particularly, the invention relates to processes for the production, from glucose or maltose and edible polycarboxylic acid catalysts, of soluble and insoluble polyglucoses and polymaltoses, and the products of these processes. The invention also relates to novel uses for these new materials wherein the new materials are incorporated into food products as non-nutritive substitutes for carbohydrate sweeteners, as non-nutritive substitutes for flour and other starches and as fat sparing agents in many recipes.

Many substances are used in the manufacture of foods intended for persons who must restrict their intake of carbohydrates or calories or both. Generally, ingredients which are to be included in these foods must be without substantial calorific value and be non-nutritive. Furthermore, the dietetic foods produced with these ingredients must closely resemble calorie-containing foods in texture, taste and physical appearance. In addition, these ingredients must not, of course, present any problems of toxicity to the consumer of the food. Many materials which have been proposed for use in dietetic foods do not satisfy all of these requirements simultaneously.

Where a synthetic sweetener such as saccharin or cyclamate is used in a dietetic food to replace the sugar present in the natural food, the other physical properties, aside from sweetness, which were imparted to the natural food by the sugar must be imparted to the synthetic dietetic foood by additional ingredients other than the synthetic sweetener. The additional ingredients which have been heretofore suggested for this use are often nutritive themselves, and therefore add undesirable calorific value to the food to replace the calorific value contained in the sugar which was removed. These ingredients also may alter the texture or eating qualities of the food so that it becomes unappealing or unwholesome. Finally, these additional ingredients may impart an unnatural color to the food, and, consequently, render it less palatable.

Accordingly, it is an object of this invention to provide an ingredient for use in dietetic food compositions which will impart physical properties to the food compositions similar to the properties of natural foods which normally contain sugars, without adding substantial nutritive value to the food. The dietetic foods will generally contain low-caloric sweeteners, such as saccharin, L-aspartyl-L-phenylalanine methyl ester, fructose, neohesperidine dihydrochalcone, N'-acetylkynurenine and N'-formylkynurenine, which will supply the taste of the sugar while the ingredients of the invention may be used to impart physical properties other than sweetness.

Another object of this invention is to provide materials for use in dietetic foods which may be economically and simply produced and which require little or no purification in order to render them suitable for inclusion in dietetic foods.

Another object of this invention is to provide ingredients for dietetic foods which are not harmful to the consumer, which do not impart an unnatural color to the foods in which they are used and which retain their physical properties over long periods of time in storage and while combined in the foods.

Natural foods, such as baked products, often contain highly nutritive carbohydrates, other than sweeteners which are used to impart bulk and substance to the food and which constitute the main portion of the solid structure of the food. Thus, in cakes and breads, the flour which is included in the baking mix becomes the main constituent of the baked matrix which is the final foodstuff. Consequently, persons who must restrict their intake of carbohydrates or calories or both are normally required to limit their consumption of these foods due to the large proportion of flour and other starch materials contained in the foods. Attempts to replace the starches or flour in baked goods have been largely unsuccessful due to the fact that the materials which are used to replace the flour often modify the physical properties of the food so as to destroy its appearance and render it unappetizing.

Accordingly, it is a further object of this invention to provide ingredients for use in dietetic foods which may be used to replace a substantial portion of the flour or other starch materials which would normally be contained in the natural counterpart of the dietetic foods.

Another object of this invention is to provide such ingredients for use in dietetic foods which will permit the dietetic food to retain its appetizing physical appearance and will not alter the texture or eating qualities of the food.

It is well known that glucose polymers may be prepared by heating glucose in the presence of acid catalysts. Glucose polymers prepared by the known processes are not suitable for use in foods until the inedible acid catalysts which are used have been removed from the polymeric materials formed in the polymerization. Where the inedible acid catalysts cannot be removed with substantial completeness, the glucose polymers in which they are contained are not suitable for use in foods at all. Another complication involved in the known processes results from the fact that the polymers produced in these processes must often be separated from the aqueous or non-aqueous reaction media before they can be used in the preparation of non-caloric foods. Most of the previously known processes require the use of an aqueous reaction medium. In addition, the polyglucoses produced by the known processes are often highly colored and are therefore unsuitable for use in foods without further preparation or purification.

The art is well expressed in U.S. Pat. No. 2,719,179 which teaches a process for producing higher polysaccharides by heating a saccharide in a liquid medium in the presence of an acid catalyst. The process of my invention differs from and improves upon the process taught by U.S. Pat. No. 2,719,179. The process of my invention does not require additional separation steps in which the polymer must be separated from the acid polymerization catalyst and from a liquid reaction medium in order to produce edible polyglucoses and polymaltoses. Furthermore, my process may be advantageously used to directly produce edible polyglucoses and polymaltoses which are water-soluble.

Other processes for polymerizing molten glucose and maltose, as exemplified by the teachings of U.S. Pat. No. 2,436,967, are useful for producing soluble polyglucoses and polymaltoses only. Unlike the products produced by my process, the soluble products of these processes must undergo further processing in order to become suitable for inclusion in edible foods. The further processing required of these products involves the removal of the acid catalysts used with these older processes. The products produced by both these processes may be highly colored and may require further treatment prior to their incorporation into dietetic foods.

The reaction of monosaccharides with an equimolar proportion of acid at atmospheric pressure is described in U.S. Pat. No. 1,999,380. The saccharide esters produced by this reaction are entirely different from the products of the present invention. These esters are recommended for use in lacquers and impregnating compounds, but they are unsuitable for use as non-nutritive carbohydrate substitutes in foods. Further, under the atmospheric pressure conditions employed in this prior process, attempts to reduce the proportion of acid from equimolar to catalytic levels yield only black intractable tars equally unsuitable for use in foods.

Accordingly, it is an object of this invention to provide a process for producing soluble and insoluble glucose and maltose polymers which utilizes edible acids as catalysts, as polymerization activators, and as cross-linking agents. This eliminates the necessity to remove the acid catalyst or excess acid from the polymers before they can be used as ingredients in many dietetic foods.

Another object of this invention is to provide a process for the production of polymeric glucose and maltose products which will not impart unnatural colorations to the dietetic foods in which the polyglucose or polymaltose are incorporated.

A further object of this invention is to provide an advantageous process for the production of polyglucose and polymaltose which is carried out in anhydrous medium by melt polymerization, thereby eliminating the need to separate the polymers from reaction medium.

A further object of this invention is a process for the production of polyglucoses and polymaltoses of superior properites by the addition of sorbitol or other food grade alditols to the saccharide-carboxylic acid mixtures prior to polycondensation.

Another object of this invention is to provide dietetic food compositions comprising a fatty-triglyceride containing food wherein at least part of said triglyceride ordinarily contained therein is replaced by a water-soluble highly-branched polyglucose wherein the 1 → 6 linkage predominates, said polyglucose having a number average molecular weight between about 1,500 and 18,000 and containing from about 0.5 to 5 mole percent polycarboxylic acid ester groups wherein the acid is selected from the group consisting of citric, fumaric, tartaric, succinic, adipic, itaconic and malic acids. The above-described polyglucose may also contain from about 5 to 20% weight of sorbitol chemically bonded thereto.

A further object of this invention is to provide dietetic food compositions comprising a fatty-triglyceride- and carbohydrate-containing food wherein at least part of said triglyceride and said carbohydrate ordinarily contained therein are replaced by said water-soluble highly-branched polyglucose.

A further object of this invention is to provide dietetic food compositions comprising a fatty-triglyceride- and carbohydrate-containing food wherein at least part of said triglyceride and substantially all of said carbohydrate ordinarily contained therein are replaced by said water-soluble highly-branched polyglucose.

Various other objects and advantages will appear from the following description of the invention and the novel features will be particularly pointed out hereinafter in connection with the appended claims.

SUMMARY OF THE INVENTION

The essence of this invention is the discovery that glucose and maltose polymers which can be used as dietetic food ingredients can be produced directly from glucose and maltose by a process of anhydrous melt polymerization using edible acids as catalysts and as cross-linking agents. Another element of this invention is the discovery that two types of polyglucose and polymaltose can be simultaneously produced by anhydrous melt polymerization and that either type can be produced separately in the process of adjusting the initial acid concentration, the reaction duration and the reaction temperature.

DETAILED DESCRIPTION OF THE INVENTION

The two types of polyglucose or polymaltose which are produced are a soluble polyglucose or polymaltose, which may be used to replace sugars in dietetic foods when the sweetening effect of the sugar is obtained with the use of artificial sweeteners, and an insoluble type in which the acid polymerization activator is incorporated into the polymer in the form of cross-linking moieties. The insoluble type may be used as a substitute for flour or other starches in the production of dietetic foods.

It will be understood that the terms polyglucose, polymaltose and polysaccharide, as used in describing this invention, are intended to denominate polymeric materials in which the majority of monomeric moieties are glucose, maltose or other saccharide, as well as polymeric materials in which the glucose, maltose or saccharide moieties are esterified with moieties derived from the polycarboxylic acids used as polymerization activators.

The starting materials used in the melt polymerization process are maltose or glucose, although other simple sugars may be used as well. The sugars are supplied to the process as dry anhydrides or dry hydrated solids and are in powdered form.

The acids used as catalysts, cross-linking agents or polymerization activators may be any one of a series of relatively non-volatile, edible, organic polycarboxylic acids. In particular, we prefer to use citric, fumaric, tartaric, succinic, adipic, itaconic or malic acids. The anhydrides of succinic, adipic and itaconic acids may also be used. The acid or anhydride must be food-acceptable, that is, palatable and free of significant adverse effect at the level of ordinary use. Inedible acids, while chemically suitable to the process, are not suitable for use in the production of edible polyglucoses or polymaltoses. Therefore, the selection of the acid catalyst to be used must be guided by the needs of human non-toxicity. Inorganic acids are not suitable for use as acid catalysts in anhydrous melt polymerization since they will not serve as cross-linking agents in the production of the insoluble polyglucoses and polymaltoses. Monocarboxylic acids will not be effective as cross-linking agents and will not be as satisfactory as polycarboxylic acids as catalysts in anhydrous melt polymerization. The acid selected should be relatively non-volatile, since more volatile acids may be vaporized during the heating and melting processes by which the mixture is polymerized. The polycarboxylic acids used are largely, but incompletely, esterified with the polyglucose or polymaltose in the polymerizing process, forming acid polyglucose esters or acid polymaltose esters. This is evidenced by the residual acidity of the polyglucoses and polymaltoses after dialysis, and the recovery of the acid upon hydrolysis of the product. The incorporation of the acid moieties within the polyglucoses or polymaltoses does not affect their suitability for human consumption.

The acid moieties are likely to serve as cross-linking agents between different polyglucose or polymaltose molecules in the insoluble polymers whereas, in the soluble polymers, each acid moiety is more likely to be esterified to only the polymer molecule.

The performance of this portion of the invention involves the steps of combining the dry powdered glucose or maltose with the proper amount of acid; the heating and melting of the glucose or maltose and the acid under reduced pressure; the maintenance of the molten conditions in the absence of water until substantial polymerization occurs; and the separation of the individual polymeric product types.

The anhydrous melt polymerization must be carried out at a pressure below atmospheric pressure. The preferred pressures do not exceed about 300 mm, e.g. from about $10^{-5}$ to 100–300 mm. Hg, and can be obtained by the use of a vacuum pump, a steam jet ejector, an aspirator or by other means. The vacuum is required in order to exclude air from the polymerization and to remove the water of hydration and the water liberated in the polymerization reaction. Air should be excluded from the environment of the polymerizing mixture in order to minimize decomposition and discoloration of the polyglucoses or polymaltoses formed in the polymerization. A fine stream of nitrogen has also been found to be useful with this invention as a method for excluding air and removing the waters of hydration and polymerization which are formed. Where the nitrogen purge is used, the vacuum requirements are lessened but pressures of 100–300 mm. Hg. or less are still preferred.

The duration of the reaction and the reaction temperature are interdependent variables in the operation of this invention. A preferable temperature for the melt polymerization in the laboratory is from about 140°C to about 180°C. The precise temperature for the anhydrous melt polymerization depends on the initial ratio of glucose, maltose or other sugars to the acid which is used, the reaction time and the proportion of soluble polyglucoses or polymaltoses to insoluble, cross-linked polyglucoses or polymaltoses which is desired in the final product mixture.

The production of a large proportion of soluble glucose or maltose polymers usually requires a concentration of acid catalyst between about 0.1 and 10 mole percent, and we prefer to use between 0.5 and 5 percent. As the amount of acid is increased, the degree of acid cross-linking increases and the proportion of water-insoluble polyglucose or polymaltose increases. Where acid concentrations are unnecessarily high, problems may arise with regard to neutralizing the excess acid which is present in the final product mixture. As those skilled in the art will perceive, the amount of acid required for a particular polymerization, the polymerization duration, the polymerization temperature and the nature of the products desired are all interdependent. The selection of the amount of acid to be used in this invention should take account of these factors.

The thermal exposure (reaction time and temperature) used in the production of soluble polyglucoses or polymaltoses by melt polymerization should be as low as possible, since discoloration, caramelization and degradation increase with prolonged exposure to high temperature. Fortunately, however, as the temperature of the polymerization is increased, the time required to achieve substantially complete polymerization decreases. Therefore, the process of this invention may be conducted with a polymerization temperature of about 160°C and a reaction duration of about 8 hours, as well as at a temperature of about 140°C and a reaction duration of about 24 hours, with approximately the same resultant degree of polymerization. Comparable results are also achieved in continuous polymerization at temperatures in the range of about 200°–300°C in about 10 minutes or less without significant darkening, under vacuum of course.

In the production of insoluble polyglucoses or polymaltoses, the molar ratio of glucose or maltose to acid may also be within the ranges specified above for production of the soluble polysaccharides, and especially about 2.5–10 mole percent of acid. It is preferred, however, in the performance of this invention to use a molar ratio of glucose or maltose to acid between about 12:1 and 20:1 in the production of insoluble polyglucose or polymaltose. These ratios are preferred in spite of the requirements of high reaction temperature and relatively long reaction times because the total yield of soluble and insoluble polyglucoses or polymaltoses is between 90 and 99 percent at these sugar to acid ratios. Thus, using these higher ratios, it is possible to produce in one reaction mixture a yield of between about 50 and 60 percent of insoluble polyglucose or polymaltose and of between about 40 and 50 percent of soluble polyglucose or polymaltose. The watersoluble polyglucose or polymaltose can be separated from the insoluble polyglucose or polymaltose contained in the reaction mixture by extraction with water and subsequent centrifugation. An additional important advantage of performing the reaction at high molar ratios of glucose or maltose to acid derives from the fact that the resultant products require little or no neutralization, whereas neutralization of excessive acid levels introduces salt concentrations unacceptable in a product for use in foods.

The inclusion of a food acceptable polyol such as sorbitol in the saccharide-carboxylic acid reaction mixtures prior to polycondensation yields superior products. In most cases, 90% or more of the polyol cannot be isolated from the condensation product, demonstrating that is has been chemically incorporated in the polymer. These additives function as internal plasticizers to reduce viscosity, and also provide improved color and taste. This is evident, for example, in the manufacture of hard candy from such condensation polymers, where the rheological properties of the melt are improved during processing, foaming is minimized, and a better tasting product of lighter color is obtained. In addition to sorbitol, other food-acceptable polyols include glycerol, erythritol, xylitol, mannitol and galactitol. Polyol concentrations of from about 5 to 20% by weight of the total reaction mixture provide such advantages, and levels of about 8–12% by weight are preferred.

Chemical purification is not generally required for the products of this invention. Where insoluble and soluble glucoses or maltoses are produced together, separation may be required.

Neutralization of the polyglucoses or polymaltoses may be desirable for certain applications, despite the very low levels of acid catalyst which are employed. For example, where the polyglucoses are to be used in dietetic foods containing whole milk, excess acid which may be present in the unneutralized polyglucoses will tend to curdle the milk. In the case of the soluble polyglucoses or polymaltoses, the solutions of the polyglucoses or polymaltoses are neutralized directly. This neutralization may be accomplished by adding carbonates of potassium, sodium, calcium or magnesium to the solutions of polyglucose or polymaltose. Where sodium and potassium are used together, a physiologically balanced mixture may be used. The salt content of a typical polyglucose solution which has been adjusted to a pH of about 5 to 6 is a mere 0.5 to 1.0 percent. Other materials which may be used to adjust the pH of soluble polyglucose or polymaltose solutions include l-lysine, d-glucosamine, N-methyl glucamine and ammonium hydroxide. The first two of these compounds are natural materials and should not be objectionable as an ingredient of dietetic foods and the last compound, which is rapidly excreted by the body in the form of urea, would not be objectionable as an ingredient in dietetic foods. N-methyl glucamine is used as solubilizing agent for pharmaceuticals and should not be objectionable as an ingredient in dietetic foods. Other methods for reducing the acidity of polyglucose or polymaltose solutions are dialysis and ion exchange.

Decolorization of the soluble and insoluble polyglucoses and polymaltoses produced by this invention is often desirable for certain uses, despite their inherently light color as produced. Soluble polyglucose or polymaltose may be decolorized by contacting a solution of the polyglucose or polymaltose with activated carbon or charcoal, by slurrying or by passing the solution through a bed of the solid adsorbent. Soluble and insoluble polyglucoses and polymaltoses may be bleached with sodium chlorite, hydrogen peroxide or similar materials which are used for bleaching flour. The insoluble polyglucose is a yellow powder and often does not require bleaching at all.

Where insoluble polyglucose is to be used as a flour substitute in dietetic foods it may be ground or subdivided mechanically so that it manifests a consistency similar to that of wheat flour. Typically, 325 mesh material is used as the wheat flour substitute.

The solutions of soluble polyglucose or polymaltose are almost tasteless and the insoluble polyglucose is a bland-tasting yellow powder.

Most of the polyglucoses produced in this invention have an average molecular weight from about 1,500 to about 36,000. The soluble polyglucoses which are produced have been found to have an average molecular weight from about 1,500 to 18,000 and the insoluble polyglucoses produced in this invention have been found to have an average molecular weight of between about 6,000 and about 36,000.

The experimentally determined number average molecular weights of the polyglucoses produced in this invention are usually found to range from about 1,000 to about 24,000, with most of the molecular weights falling in the range from 4,000 to about 12,000. These number average molecular weights were determined by the modified reducing end-group method according to Isbell (J. Res. Natl. Bur. Standards 24, 241 (1940)). This method is based on the reduction of alkaline copper citrate reagent. The number average molecular weight values are computed on the basis of standardization with gentiobiose, assuming that equimolar quantities of polyglucose and gentiobiose have approximately the same reducing power and assuming one reducing end group per molecule. The number average molecular weight determined in this fashion appears to be a misleadingly low figure, emphasizing the low end of the molecular weight distribution of polycondensation products having broad molecular weight distributions. When the modified reducing end-group method was used to determine the number average molecular weight of a commercial clinical grade of dextran with a known number average molecular weight of 40,000 ± 3,000 the reducing end-group method yielded a number average molecular weight of 25,600. For this reason it is considered appropriate to multiply the number average molecular weights found by the modified reducing and group method by about 1.5. The number average molecular weight values given in the examples which follow are therefore called the apparent number average molecular weight where they have been determined by the modified reducing end-group method outlined here. These apparent number average molecular weights are indicated as $a\overline{M}_n$. Where sorbitol or other polyol is incorporated in the polymerization mixture such agent tends to be incorporated at the end of the polymer chain, in which case molecular weight determinations based on end-group methods prove inaccurate. Accordingly, one of the many other well-known methods for molecular weight determination should be employed with these polymers.

The linkages which predominate in the polyglucoses are primarily 1 → 6 but other linkages also occur. In the soluble polyglucoses each of the acid moieties is esterified to polyglucose. Where the acid moiety is esterified to more than one polyglucose moiety, cross-linking results.

Synthetic polyglucoses, as prepared by the method of this invention, are unaffected by amylolytic enzymes such as amylo(1,4) glucosidases, amylo(1,4,1,6)-glucosidases, amylo(1.4)dextrinases and amylo(1.4-)maltosidases as well as $\alpha$ and $\beta$-glucosidases, sucrase, and phosphorylase. Animal nutrition and radioactive tracer studies also demonstrate that these polyglucoses are substantially non-caloric.

The soluble polyglucoses and polymaltoses are useful for imparting the physical properties of natural foods, other than sweetness, to dietetic foods from which the natural sugars have been removed and replaced by artificial or other sweeteners. In baked goods, for example, the new polysaccharides affect rheology and texture in a manner analogous to sugar and can replace sugar as a bulking agent. Typical uses for the soluble polyglucoses are found in low calorie jellies, jams, preserves, marmalades and fruit butters; in dietetic frozen food compositions including ice cream, iced milk, sherbet and water ices; in baked goods such as cakes, cookies, pastries and other foodstuffs containing wheat or other flour; in icings, candy and chewing gum; in beverages such as non-alcoholic soft drinks and root extracts; in syrups; in toppings, sauces and puddings; in salad dressings and as bulking agents for dry low calorie sweetener compositions containing cyclamate or saccharin.

The use of the polyglucoses of this invention allows the elimination of 20–100% of the normal fat, oil or fatty triglyceride components of the food. The degree of fat, oil or fatty triglycerides elimination will naturally vary with the type of food, for example in a French salad dressing it is possible to completely eliminate the oily component normally included. In chocolate coatings, ice cream mixes and whipped toppings, 20–80% of the fat, oil or triglyceride can be eliminated while still retaining the required food characteristics such as texture, gloss, viscosity and taste of the food product.

As previously mentioned, aside from the replacement of sugar in many recipes there is an appreciable flour sparing and/or fat sparing effect that is possible without decreasing the quality of the food. This of course, provides a further reduction in total calorie value of the food. Illustrations of these effects are provided in the examples but the effect should by no means be construed to be limited to just these examples.

The insoluble polyglucoses are useful as flour substitutes in cakes, cookies, bread, pastries and other baked products involving flours derived from wheat, corn, rice or potatoes as well as baked products which would normally contain graham flour, rye, soya, oatmeal or bean flour. In addition, the insoluble polyglucoses are useful in unleavened food materials such as spaghetti and noodles or as a vehicle in meat hashes and mashed potatoes as well as for other uses to which flour may be put as a food ingredient.

When the polyglucoses and polymaltoses of this invention are incorporated into dietetic foods, the resultant foods retain the palatable and appetizing qualities of their natural counterparts. Furthermore, the calorific value of these dietetic foods is lowered considerably by the fact that the products of this invention have been used to replace sugars, starches and fats which are contained in the natural counterparts of the dietetic foods.

The tern fatty-triglyceride refers to glycerol esters of the higher fatty acids contained in fats and oil.

The use of the soluble polyglucoses allows the elimination of at least part of the fatty-triglyceride component of the food. The degree of fatty-triglyceride elimination will naturally vary with the type of food; for example, in a French salad dressing it is possible to completely eliminate the oil component normally included. In other types of food products, at least part of the carbohydrate ordinarily contained is replaced by the soluble polyglucoses. Also, in some products at least part of the fatty-triglyceride and substantially all of the carbohydrate ordinarily contained is replaced by a soluble polyglucose.

This so-called fat-sparing effect is possible without decreasing the quality of the food, in that the required food characteristics such as texture, gloss, viscosity and taste are still retained. Furthermore, the calorific value of these foods is lowered considerably by the fact that the soluble polyglucoses have been used to replace sugars and fatty-triglycerides which are contained in the natural counterparts of the dietetic foods.

While citrated and tartrated polyglucose are commonly used in the neutralized or acid forms, the preferred forms are citrated polyglucose with sorbitol, neutralized or acid form. Thus the term modified polyglucose includes citrated polyglucose with sorbitol.

This fat-sparing effect is possible in dessert products such as puddings and ice creams, in which from about 0.2 to 1 part by weight of modified polyglucose replaces each part by weight of the fatty-triglyceride and carbohydrate normally present in the product.

In the case of garnishes such as salad dressings (e.g. Italian, French, Blue Cheese), mayonnaise, gravy mix and barbecue sauce, from about 0.3 to 3 parts by weight of the modified polyglucose replaces each part by weight of the fatty-triglyceride and carbohydrate normally present in the product.

In confections, such as sweet chocolate, whipped toppings and milk shakes, from about 0.3 to 1.5 part by weight of the modified polyglucose replaces each part by weight of the fatty-triglyceride and carbohydrate normally present in the product.

In leavened baked foods such as cakes, cookies and cupcakes, from about 0.25 to 1.5 part by weight of the modified polyglucose replaces each part by weight of the fatty-triglyceride and carbohydrate normally present in the product.

Artificial sweeteners which may be used in conjunction with modified polyglucose in these food products include saccharin, L-aspartyl-L-phenylalanine methyl ester, aspartyl-D-valine isopropyl ester, aspartyl amino malonates and dialkyl aspartyl aspartates, N-acylkynurenines, stevioside, glycyrrhizin and neohesperidin dihydrochalcone. The term L-aspartyl-L-phenylalanine methyl ester and methyl L-aspartyl phenylalanine are used interchangeably.

It will be understood that various changes in the details, materials and steps which have been herein described and illustrated in order to explain the nature of the invention may be made by those skilled in the art within the principle and scope of the invention as expressed in the appended claims.

The invention will be more fully understood in the light of the following specific examples, which are set forth below in illustration only and are not intended to be limiting. Representative examples of foods incorporating soluble modified polyglucose are included. While these examples set forth proportions of the polyglucoses which are suitable for the particular dietetic food involved, the quantities of polyglucose required for other food compositions encompassed by this invention can be readily determined. Standard manufacturing procedures are applicable to each of the recipes for dietetic foods which are given in the examples.

EXAMPLE I

Citrated soluble Polyglucose by Melt Polymerization

An intimate mixture of 500 grams of powdered anhydrous glucose and 12.8 grams of finely ground citric acid was placed in a stainless steel tray and heated in a vacuum oven at 160°C at a pressure of 0.1 mm. Hg. for 8 hours. The light yellow product was completely water-soluble and contained only a trace of unreacted glucose. The following data for the polymer were determined: Reducing value (RV) = 7.0 (Hagedorn-Jensen iodometric method); apparent number average molecular weight ($a\overline{M}_n$) = 9,100; pH (5 percent aqueous solution) = 2.9; acid equivalent = 9.6 mg. NaOH/g.; optical rotation +63.6° ($c$ = 1, water); intrinsic viscosity [$\eta$] = 0.053 dl./gm.

EXAMPLE II

Tartarated Polyglucose with Sorbitol, Melt Polymerization by Continuous Process

A pre-blend of 700 lbs. of Cerelose monohydrate, 78.6 lbs. of sorbitol monohydrate, and 7.2 lbs. of anhydrous tartaric acid was melted at 120°C. in a steam-jacketed screw conveyor (Rietz Thermascrew). The molten material was continuously fed to a vacuum-operated, 0.25 cubic foot, continuous double-arm mixer (Baker-Perkins Multipurpose Continuous Mixer) and heated to 165°–245°C at a pressure of 75 –100 mm. Hg. at a feed rate adjusted to obtain a retention time of about 5 minutes. Data for the soluble polymer from a representative run were as follows:

| | |
|---|---|
| Reducing value (Munson & Walker) | 3.8 |
| pH (5% aqueous solution) | 3.2 |
| Acid equivalent | 4.8 |
| Residual glucose (Percent) | 0.75 |
| Residual sorbitol (Percent) | 1.77 |
| Non-dialyzable fraction (Percent) | 57.4 |

EXAMPLE III

Tartarated Polyglucose with Erythritol, Melt Polymerization by Continuous Process The process of Example II, differing only in the substitution of erythritol for sorbitol, produces a polyglucose closely resembling that obtained in Example II.

EXAMPLE IV

Citrated Soluble and Insoluble Polyglucose Mixture

A charge of 320 grams of dried Cerelose and 20 grams of powdered citric acid were mixed thoroughly, placed in a flask and melted with stirring under a pressure of 14 mm. Hg. The melt was held at 170°C for 25 hours. The crude polymer was milled and separated into soluble and insoluble polyglucoses by extraction with water. The following data was obtained:

| | Crude | Insoluble Polyglucose | Soluble Polyglucose |
|---|---|---|---|
| Yield (Percent) | 100 | 68 | 32 |
| RV | 5.1 | 2.6 | 5.1 |
| $a\overline{M}_n$ | 6100 | 10500 | 6000 |
| pH (5 percent) | 2.75 | 2.65 | 2.6 |
| Acid Eq. (mg. NaOH/g.) | 12.8 | 12.8 | 12.0 |

EXAMPLE V

Fumarated Soluble Polyglucose by Melt Polymerization

A mixture of 257 grams of dried Cerelose and 10 grams of fumaric acid were melted in a flask without stirring and held at 160°C for 17 hours at a pressure of 23 mm. Hg. The pale yellow colored polymer showed a RV of 7.7 and an $a\overline{M}_n$ of 5100. The pH of a 5 percent aqueous solution was 2.6, and the acid equivalent was 19.2 mg. NaOH/g. The optical rotation was +60.2° ($c$ = 1, water) and the Gardner color index 2.5 (10% w/v aqueous solution).

EXAMPLE VI

Succinated Soluble Polyglucose by Melt Polymerization

A milled mixture containing 190 grams of glucose and 10 grams of succinic acid was heated in a glass tray in a vacuum oven at 140°C for 24 hours at a pressure of 0.2 mm. Hg. until polymerization was substantially complete. The water-soluble polymer had a RV of 14.2 and an $a\overline{M}_n$ of 2630. The pH (5 percent aqueous solution) was 3.1 and the acid equivalent was 11.2 mg.NaOH/g. The crude material had a Gardner color index of 10 (10 percent w/v solution).

EXAMPLE VII

Adipated Soluble Polyglucose by Melt Polymerization

A charge of 306 grams of Cerelose was mixed with 22.5 grams of adipic acid in a stirred flask and heated at 153°C at a pressure of 19 mm. Hg. for 12 hours. A nitrogen purge of 10 milliliters per minute was used. The completely water-soluble polymer had a RV of 25.7, an $a\overline{M}_n$ of 1550, a pH (5 percent aqueous solution) of 3.0, an acid equivalent of 20 mg. NaOH/g., and an optical rotation of +49.3° ($c$ = 1, water).

EXAMPLE VIII

Tartarated Soluble Polyglucose by Melt Polymerization

A mixture of 380 grams of powdered glucose and 20 grams of powdered tartaric acid was melted in a glass tray in a vacuum oven and held at 142°C and 0.2 mm. Hg. for 4.5 hours. The resulting product was shown to contain 68 percent of non-dialyzable polymer, which showed a RV of 6.5 and an $a\overline{M}_n$ of 7500. The intrinsic viscosity [$\eta$] was 0.04 dl./gm.

EXAMPLE IX

Melt Polymerization of Maltose with Citric Acid

A 300 gram mixture of maltose monohydrate containing 5 weight percent citric acid was melted in a flask. The melt was held at 160°C and a pressure of 11 mm. Hg. for 7 hours. The product was a completely water-soluble polymaltose, showing a RV of 19.6 (maltose standard) and an $a\overline{M}_n$ of 2200. The pH of a 5 percent aqueous solution was 3.2, and the acid equivalent was 18.4 mg. NaOH/g. The optical rotation was +119.9° ($c$ = 1, water), and the Gardner color index 7.5 (10 percent w/v solution).

EXAMPLE X

Melt Polymerization of Glucose with Succinic Anhydride

An intimate mixture of 300 grams of powdered dried Cerelose and 15.8 grams of finely ground succinic anhydride was placed in a flask and melted rapidly at a temperature of between 160°C and 165°C and at a pressure of 100 mm. Hg. The rapid melting, which was completed in 45 minutes, was required in order to minimise the loss of the anhydride from the mixture by sublimation. The temperature was lowered to 142°C and the pressure to 26 mm. Hg. The mixture was held at these conditions for 16 hours after which the polymerization was substantially complete. The yellow product was completely water-soluble. The following properties were determined for the polymer: RV = 27.5; $a\overline{M}_n$ = 1,240; pH (5 percent aqueous solution) = 2.8; acid equivalent = 14.4 mg. NaOH/g; optical rotation = +52.0° ($c$ = 1, water); Gardner color index = 7 (10 percent w/v aqueous solution).

Where adipic anhydride is used in place of the succinic anhydride, a completely water-soluble polymer is obtained which manifests similar properties.

EXAMPLE XI

Melt Polymerization of Glucose with Itaconic Anhydride

An intimate mixture of 300 grams of powdered dried Cerelose and 15.8 grams of finely ground itaconic anhydride was placed in a flask and melted, over a period of 45 minutes, at a temperature of between 160°C and 165°C and at a pressure of 100 mm. Hg. The rapid melting was required in order to prevent the loss of the itaconic anhydride by sublimation from the mixture. After the mixture was melted the temperature was lowered to 142°C and the pressure was lowered to 26 mm. Hg. The mixture was held at these conditions for 16 hours after which the polymerization was substantially complete. The yellow product obtained was completely water-soluble. The following data were obtained for the polymer: RV = 15.5; $a\overline{M}_n$ = 2420; pH (5 percent aqueous solution) = 2.85; acid equivalent = 13.2 mg. NaOH/g.; optical rotation = +55.2°; Gardner color index (10 percent w/v aqueous solution) = 4.5.

EXAMPLE XII

Fumarated Polyglucose with Sorbitol, Melt Polymerization by Batch Process 212 lbs. of Cerelose monohydrate, 7.5 lbs. of anhydrous fumaric acid, and 21 lbs. of sorbitol monohydrate were added to a 100 gallon stainless steel vacuum reactor and heated at 160°–172°C at a pressure of 100–300 mm. Hg. for 3 hours and 15 minutes. The material was dropped into stainless steel trays, cooled, crystallized, and milled. The following data for a polymer from a representative run were obtained:

| | |
|---|---|
| Reducing value (Hagedorn-Jensen) | 16.0 |
| pH (5% aqueous solution) | 2.7 |
| Residual fumaric acid (Percent) | 0.1 |
| Residual glucose (Percent) | 2.4 |
| Residual sorbitol (Percent) | 0.8 |

Comparable results are achieved by this procedure with substitution of 8 lbs. terephthalic acid for the fumaric acid.

EXAMPLE XIII

Fumarated Polyglucose with Sorbitol, Melt Polymerization by Batch Process

The precess of Example XII wherein the sorbitol level is raised to 20 wt. %, produces a polyglucose closely resembling that obtained in Example XII.

EXAMPLE XIV

Fumarated Polyglucose with Glycerol, Melt Polymerization by Batch Process

The process of Example XII, differing only in the substitution of glycerol for sorbitol, produces a polyglucose closely resembling that obtained in Example XII.

EXAMPLE XV

Fumarated Polyglucose with Sorbitol, Melt Polymerization by Continuous Process

A pre-blend of 110 lbs. of Cerelose monohydrate, 11 lbs. of sorbitol monohydrate, and 3.9 lbs. of anhydrous fumaric acid was melted using a steam-jacketed screw conveyer. The molten mass was continously fed to a one-square-foot, wiped-film vacuum reactor and heated to 22°–295°C. at a pressure of 300 mm. Hg. at a feed rate adjusted to obtain retention times of 3–8 minutes. The following data for a polymer obtained from a representative run were determined: Reducing value (Munson & Walker) = 3.8; non-dialyzable fraction — 50%.

EXAMPLE XVI

Fumarated Polyglucose with Sorbitol, Melt Polymerization by Continuous Process

The process of Example XV, wherein the sorbitol level is reduced to 5 wt.%, produces a polyglucose closely resembling that obtained in Example XV.

EXAMPLE XVII

Cake

A cake, using the products of this invention as ingredients, was prepared using the following proportions of ingredients and the following directions.

| | Grams |
|---|---|
| Oleomargarine | 12.0 |
| Skim milk | 15.0 |
| Whole egg powder | 25.0 |
| Water | 90.0 |
| Salt | 0.6 |
| Soluble decolorized polyglucose citrated | 25.5 |
| Bleached cake flour | 24.6 |
| Insoluble polyglucose (325 mesh) | 24.0 |
| Sodium powder | 0.5 |
| Baking powder | 2.0 |
| Calcium cyclamate | 0.783 |
| Sodium saccharin | 0.093 |
| Imitation vanilla flavoring | 0.1 |

Blend whole egg powder with 75 grams of water and permit mixture to stand for 1 hour. In a separate vessel mix oleomargarine, milk, salt, soluble polyglucose and 1 gram of baking powder. Add the mixture of water and whole egg powder carefully, in small increments, creaming well after each addition. Add the remaining water and the vanilla flavoring and mix for 5 minutes. To this blend add the sodium saccharin and calcium cyclamate dissolved in a small amount of water. Cream the mixture well. In another vessel mix flour, insoluble polyglucose, the remaining baking powder and the sodium bicarbonate. Mix the combined ingredients for 10 minutes until a homogenous creamy composition results. Pour the mixture into a cake mold and bake for 20 to 25 minutes at 210°C.

EXAMPLE XVIII

Pudding

A pudding, incorporating the products of this invention as ingredients, was made using the following proportions of ingredients and according to the following directions.

|  | Grams |
| --- | --- |
| Soluble polyglucose citrated | 6.0 |
| Corn starch | 2.5 |
| Calcium cyclamate | 0.240 |
| Sodium saccharin | 0.023 |
| Imitation vanilla flavoring concentrate | .02 |
| Sodium chloride | .05 |
| Whole milk | 45.0 |

Premix all the ingredients except the milk. Heat the milk gently while adding the mixed ingredients to it. Allow the mixture to boil gently for 10 to 15 minutes. Pour the mixture into pudding molds and allow to cool and solidify.

EXAMPLE XIX

Candy

A hard candy, incorporating the products of this invention as ingredients, was made using the following proportions of ingredients and according to the following directions.

|  | Grams |
| --- | --- |
| Soluble polyglucose adipated | 45.0 |
| Water | 20.0 |
| Calcium cyclamate | 0.90 |
| Sodium saccharin | 0.09 |
| Citric acid | 0.3 |
| Raspberry flavor | 0.06 |
| Raspberry FDC color | 0.01 |

Premix polyglucose and water and heat the mixture to 140°C, solubilizing the polyglucose. In a separate vessel add the sodium cyclamate and sodium saccharin to a small amount of water. In a third vessel add the citric acid, the raspberry flavoring and the raspberry FDC color to a small amount of water. Cool the mixture of polyglucose and water to 110°C and add the mixture of sweetener and water and the mixture of flavorants, citric acid, coloring and water to the polyglucose and water mixture and pour the mixture onto a table coated with mineral oil to permit partial solidification. Upon such solidification, pour the mixture into a fruit drop frame to form suitable candy shapes.

When soluble polyglucose succinate or soluble polyglucose fumarate are used in place of the soluble polyglucose adipate, a similar product is produced.

EXAMPLE XX

Maple Syrup

A maple syrup, incorporating the products of this invention as ingredients, was made using the following proportions of ingredients and according to the following directions.

|  | Grams |
| --- | --- |
| Soluble polyglucose citrated | 9.0 |
| Water | 8.0 |
| Maple extract | 0.08 |
| Sodium cyclamate | 0.45 |
| Sodium saccharin | 0.05 |

Dissolve sweeteners in water and add the polyglucose and the maple extract to the mixture. Heat the mixture to form the syrup.

EXAMPLE XXI

Dietetic Carbonated Beverage

A carbonated beverage, incorporating the products of this invention as ingredients, was made using the following proportions of ingredients and according to the following directions.

|  | Grams |
| --- | --- |
| Calcium cyclamate | 0.456 |
| Sodium saccharin | 0.040 |
| Citric acid | 0.9 |
| Strawberry flavor | 0.9 |
| Soluble polyglucose citrate | 30.0 |
| Water | 30.0 |

The ingredients are combined and 237.7 grams of carbonated water added to form the beverage.

EXAMPLE XXII

Dietetic Ice Cream

An ice cream, incorporating the products of this invention as ingredients, was made using the following proportions of ingredients and according to the following directions.

|  | Grams |
| --- | --- |
| Whole milk | 57.4 |
| Cream (40 percent) | 57.4 |
| Soluble neutralized polyglucose citrate | 39.2 |
| Sodium carboxymethyl cellulose | 0.78 |
| Calcium cyclamate | 0.25 |
| Gelatin | 0.3 |
| Imitation vanilla flavoring | 0.52 |
|  | 155.0 |

The ingredients are blended completely and frozen into appropriate forms.

EXAMPLE XXIII

Low Calorie Salad Dressing

A dietetic salad dressing, using the products of this invention as ingredients, was prepared using the following proportions of ingredients and the following directions.

|  | Grams |
| --- | --- |
| Calcium cyclamate | 0.2 |
| Dry mustard | 1.2 |
| Vinegar | 36.0 |
| Tomato sauce | 4.0 |
| Soluble polyglucose citrated | 14.0 |
| Sodium chloride | 3.0 |
| Insoluble polyglucose (200 Mesh) | 8.0 |
| Paprika | 1.0 |

|  | Grams |
|---|---|
| Onion powder | 1.0 |
| Garlic powder | 1.0 |
| Black pepper | 1.0 |
| Lemon juice (natural strength) | 6.0 |
| Water | 72.3 |
| Pectin (150 Bloom) | 1.3 |

The dry ingredients were blended and added to the water with constant agitation. Upon completion of this procedure, the lemon juice, vinegar, and tomato sauce were blended and added to the mixture of dry ingredients and water. The resulting mixture was agitated until a homogenous composition resulted.

EXAMPLE XXIV

Dry Low Calorie Sweetener Composition

A low calorie sweetener composition, using the products of this invention as ingredients, was prepared using the following proportions of ingredients and the following directions.

|  | Grams |
|---|---|
| Calcium cyclamate | 10.0 |
| Sodium saccharin | 1.0 |
| Soluble polyglucose | 189.0 |

The ingredients were mixed in a blender until a uniform homogeneous dry powder was obtained. One level teaspoon of this composition was found to produce the sweetness and viscosity of one level teaspoon of sucrose.

EXAMPLE XXV

Low-Calorie Gelatin Dessert

A dessert containing the products of this invention was prepared as follows:

|  | Grams |
|---|---|
| 9:1 Sodium cyclamate-sodium saccharin | 0.50 |
| Soluble polyglucose tartrated | 72.00 |
| Gelatin (225 Bloom) | 9.00 |
| Citric acid | 2.40 |
| Sodium citrate | 0.40 |
| Sodium chloride | 0.40 |
| Strawberry powder flavor | 0.24 |
| Strawberry FDC color | 0.06 |
| water to make | 16 oz. volume |

The dry ingredients were blended and dissolved in 8 ounces of boiling water. The solution was then diluted to 16 ounces with cold water and refrigerated to gel. Soluble polyglucose citrate gives substantially the same result.

EXAMPLE XXVI

Dry Low Calorie Sweetener Composition

Low calorie sweetener compositions using the products of this invention, were prepared using the following proportions of ingredients and the following directions:

|  | Grams | Grams | Grams | Grams |
|---|---|---|---|---|
| Sodium saccharin | 0.35 | — | — | — |
| Methyl L-aspartyl phenylalanine | — | 0.675 | — | — |
| Fructose | — | — | 50.0 | — |
| Neohesperidine dihydrochalcone | — | — | — | 0.11 |
| Soluble polyglucose | 99.65 | 99.325 | 50.0 | 99.89 |

The ingredients were mixed in a blender and a uniform homogeneous dry powder was obtained. One level teaspoon of this composition was found to produce the sweetness and viscosity of one level teaspoon of sucrose.

Examples XXVII – XXI serve to illustrate the fat-sparing effects of polyglucose in food compositions.

EXAMPLE XXVII

Two chocolate coating formulations were prepared (I) containing a regular level of confectionary sugar and hydrogenated coconut oil and (II) in which 100% of the confectionary sugar and 22% of the hydrogenated coconut oil were replaced with polyglucose tartrated.

| Chocolate Coating | Formula I | Formula II |
|---|---|---|
| Ingredients | % by wt. | % by wt. |
| Cocoa powder-Bloomers Natural containing 12% Fat | 11.484 | 11.484 |
| Confectionary sugar (200 Mesh) | 56.838 | — |
| Bleached and neutralized soluble polyglucose tartrated with sorbitol (200 Mesh) | — | 62.088 |
| Synthetic chocolate flavor | 0.100 | 0.100 |
| Hydrogenated coconut oil (98°–102°F) | 31.378 | 25.378 |
| Lecithin | 0.200 | 0.200 |
| 12:1 Calcium cyclamate/ sodium saccharin | — | 0.75 |
| Totals | 100.000 | 100.000 |

Combine the cocoa powder with polyglucose (II) or sugar (I). In a separate container combine and melt the coconut oil, flavor and lecithin in a steam bath at 60°C. Continue heating the oil at 60°C and with continuous stirring slowly introduce the cocoa powder-polyglucose mix (II) or the cocoa powder-sugar mix (I). Cook the mixture for an additional 30 minutes after the completion of the powder addition. Pass the mix through a mill and then through a very fine sieve. Transfer the resulting creamy mixture into a mold and allow it to solidify at 25°C for 48 hours.

If desired 0.75% of methyl L-aspartyl-L-phenylalanine may be substituted in Formula II for the 12:1 calcium cyclamate/sodium saccharin mixture.

Comparison of the resulting solid masses indicated that the two products compared favorably in softness, color, texture and chewability. Moreover it was noted during the coating preparation that the two materials compared favorably in viscosity.

To further assess the fat sparing effects of polyglucose the two aforementioned coatings were used to enrobe caramel flavored fondants in the following manner:

To two 50 ml. beakers were added separately 40 grams of the aforementioned solidified coating (I) and coating (II) respectively. The coatings were heated and melted in a steam bath at 60°C with continuous stirring. The coatings were then tempered by alternately dipping the beakers in cool water (20°C) and recovering, while the chocolate mix is being stirred constantly. When the coatings reached 37°–40°C, cooling was discontinued and then each of the chocolate coatings were used to enrobe 12 caramel candies of identical size and weight. The coated pieces were then stored 5 days at room temperature before being evaluated. The evaluations were conducted as follows:

1. The coated pieces were compared for gloss and softness as well as general appearance at 25°C.

2. Heat test — two enrobed pieces containing coating (I) and two containing coating (II) were placed on foil and alternately placed in a 32°C oven for 45 minutes and at 25°C for 2 hours. This procedure was repeated for a total of six cycles. The gloss of the pieces was compared and recorded after the pieces had reached room temperature. The results are indicated in the table below.

3. Heat-Cool test — two sets of enrobed pieces (2 pieces each) containing the aforementioned coatings were placed on foil, and alternately placed in an oven at 32°C for 45 minutes then in a 5°C refrigerator for one hour and subsequently placed at 25°C for 2 hours. This procedure was repeated for a total of six cycles. The gloss, texture and general appearance of the pieces were compared and recorded after the pieces reached 25°C. In the results of these tests tabulated below, the gloss results are recorded as "Ex" for excellent, "G" for good, "F" for fair and "P" for poor. Poor is the point at which the pieces have lost all gloss or have shown fat bloom.

EXAMPLE XXVIII

Two ice cream mixes were prepared and processed according to commercial practices. Formula I contains a practical level of sugar and butterfat. In Formula II 100% of the sugar and 28% of the butterfat have been replaced with bleached, neutralized polyglucose citrated.

| Ice Cream Mixes Ingredients | Formula I Wt. in Gms. | Formula II Wt. in Gms. |
|---|---|---|
| Sucrose | 56.0 | — |
| Gelatin 225 Bloom | 1.6 | 1.6 |
| Heavy cream (35% Butterfat) | 166.5 | 86.0 (1) |
| Non-fat milk solids | 35.0 | 39.0 |
| Soluble bleached and neutralized polyglucose citrated | — | 114.1 |
| 12:1 Calcium cyclamate/sodium saccharin | — | 1.375 |
| Water | 290.9 | 307.925 |
| Totals | 550.0 | 550.000 |

1. Since heavy cream contains about 3.2% of total milk carbohydrates an additional 4 grams of nonfat milk solids was added to Formula II to compensate for the additional total milk carbohydrates present in Formula I.

If desired 1.375g of methyl L-aspartyl phenylalanine may be substituted in Formula II for the 12:1 calcium cyclamate/sodium saccharin mixture.

To assess the polyglucose animal fat sparing effect the overrun of the mixes, that is the amount of air incorporated by whipping during the freezing operation was determined according to the following formulae:

$$\% \text{ overrun} = \frac{\text{volume of frozen mix} - \text{volume of mix prior to freezing}}{\text{volume of mix prior to freezing}} \times 100$$

The following overruns on the aforementioned mixes are obtained:

$$\% \text{ overrun Ice Cream Formula I} = \frac{880 \text{ ml} - 460 \text{ ml}}{460 \text{ ml.}} \times 100 = 95\%$$

$$\% \text{ overrun Ice Cream Formula II} = \frac{840 \text{ ml} - 455 \text{ ml}}{455 \text{ ml.}} \times 100 = 85\%$$

In addition to the overrun the creaminess smoothness and texture of the frozen ice creams were compared and found to be quite comparable.

| Coating Formulation | Initial | After 6 heat treatments | After 6 heat & cooling treatments | General appearance and texture |
|---|---|---|---|---|
| I Contains 56% sugar and 31% hydrogenated coconut oil | Ex | Ex | G/Ex | Smooth texture Normal color. |
| II Contains 67% polyglucose and 20% hydrogenated coconut oil | Ex | Ex | G | Smooth texture slightly darker than coating containing high level of shortening and containing sugar. |

To further demonstrate the similarity of these two ice creams, the frozen mixes were stored in similar containers at −20°C for 4 days. The melting rates were then compared by placing them at 25°C and recording their temperatures at 10 minutes intervals until the two frozen ice creams had melted. The results of this test are given below.

Dissolve the sodium caseinate, sucrose or polyglucose, nonfat milk solid and disodium phosphate in water. Add to these coconut oil, emulsifier, carboxymethylcellulose solution, flavors and disperse well. Pasturize the mix at 74°C for 30 minutes, subsequently homogenize at 1,000/500 psi, cool to 5°C and store at this temperature for 18 hours. It was then whipped at high

| Melting Rate °C of Ice Cream Containing 10% Sucrose and 10.6% Fat | Time | Melting Rate °C of Ice Cream Containing 20.7% Polyglucose and 5.5% Fat |
|---|---|---|
| −20 | 10:35 | −20 |
| −15 | 10:45 | −15 |
| −10 | 10:55 | −10 |
| −9 | 11:05 | −9.2 |
| −7 | 11:15 | −7 |
| −5 | 11:25 | −5 |
| −2 | 11:35 | −2 |
| 0 | 11:45 | 0 |
| 3.5 | 11:55 | 3.8 |
| 6.5 | 12:05 | 7 |
| 9.5 | 12:15 | 9 |
| 11.5 | 12:25 | 12 |
| 13.2 | 12:35 | 14 |
| 14.5 | 12:45 | 14.8 |
| 16.3 | 12:55 | 16.0 |
| 17.5 | 1:05 | 18.0 |
| 18.8 (At this point about 75% of ice cream melted) | 1:15 | 19.3 (At this point about 75% of ice cream melted) |
| 19.5 | 1:30 | 20 |
| 20.5 | 2:05 | 21 |
| 21.0 | 2:30 | 22 |
| 22.0 | 3:00 | 22.8 |

At 22°C both ice creams were completely melted.

EXAMPLE XXIX

Whipped toppings have recently gained wide popularity for both commercial and consumer use. A typical liquid topping Formula (I) is known to give a topping with the specific characteristic the manufacturer desires. Formula II demonstrates the fat sparing effect of bleached and neutralized polyglucose tartrate. A fat reduction of 50% in addition to replacement of the sugars was accomplished without loss of quality.

speed (No. 9 speed of Sunbeam Mixmaster for 8 minutes in a bowl using a double paddle).

If desired 0.08% of methyl L-aspartyl phenylalanine may be substituted in Formula II for the 9:1 calcium cyclamate/sodium saccharin mixture.

Comparison of the emulsion texture and stability after the mixes were retained at 5°C for 18 hours indicated the two products exhibited similar characteris-

| Liquid Whipped Toppings Ingredients | Formula I % by wt. | Formula II % by wt. |
|---|---|---|
| Hydrogenated coconut oil | 30.00 | 15.00 |
| Sodium caseinate | 1.25 | 1.25 |
| Sucrose | 6.00 | — |
| Corn syrup solids | 2.50 | — |
| 4% aqueous solution carboxymethylcellulose | 5.00 | 5.00 |
| Vanilla flavor (20 fold) | 0.15 | 0.15 |
| Non-fat milk solid | 1.25 | 1.25 |
| Imitation sour cream flavor | 0.10 | 0.10 |
| Propylene glycerol monostearate emulsifier | 0.75 | 0.75 |
| Disodium phosphate | 0.02 | 0.02 |
| Soluble bleached and neutralized polyglucose tartrated with sorbitol | — | 23.50 |
| 9:1 Calcium cyclamate/sodium saccharin | — | 0.20 |
| Water 80°C | 52.98 | 52.78 |
| Totals | 100.00 | 100.00 | tics. To further assess the similarity of these two compositions, the overrun (amount of air beaten into the mix) of the whipped emulsions was determined. In addition the waxiness, gloss (dryness), stiffness (peaks) and flavor qualities of the whipped products were compared. Results of these tests are given below.

| Formula I | % overrun | Gloss (Dryness) | Stiffness (Peaks) | Waxiness | Abnormal Flavor |
|---|---|---|---|---|---|
| Containing 30% Fat and 7.5% Sugars | 144 | Very good | Good | None | None |
| Formula II Containing 15% Fat and 23.5% polyglucose tartrate | 136 | Good | Very good | None | None |

EXAMPLE XXX

According to the Filled Milk Act of 1923, filled milk products consist of mixtures of milk and nonmilk products such as skim milk or reconstituted non-fat milk solids combined with vegetable fats and emulsifiers. The resulting product must be made to resemble milk, cream, or skim milk. Formula I is a typical formulation for a filled cream product. By comparison, Formula II, an imitation cream, demonstrates the unique fat sparing effect of bleached and neutralized tartrated polyglucose in this dairy substitute.

| Formulation Ingredients | Formulation I Filled Cream % by wt. | Formulation II Imitation Cream % by wt. |
|---|---|---|
| Bleached and neutralized soluble polyglucose tartrated with sorbitol | — | 10.420 |
| Skim milk | 81.375 | — |
| Hydrogenated coconut oil | 18.000 | 12.000 |
| Glycerol monostearate/ polysorbate 20 50/50 | 0.500 | 0.800 |
| Carrageenan | 0.015 | 0.015 |
| Locust bean gum | 0.035 | 0.350 |
| Vitamin A (10% solution) | 0.050 | 0.050 |
| Imitation butter flavor | 0.025 | 0.025 |
| Sodium Caseinate | — | 2.500 |
| F.D.C. yellow No. 5 (0.2% Solution) | — | 0.020 |
| Vanilla flavor (20 fold) | — | 0.020 |
| Sodium phosphate dibasic | — | 0.500 |
| Calcium phosphate | | 0.200 |
| 12:1 Sodium cyclamate/ sodium saccharin | — | 0.100 |
| Water 80°C | — | 73.00 |
| Totals | 100.00 | 100.00 |

If desired 0.1% of methyl L-aspartyl phenylalanine may be substituted in Formula II for the 12:1 sodium cyclamate/sodium saccharin mixture.

Conventional dairy processing equipment can be used to prepare each of the above dairy substitutes. The process is a four step operation; mixing of ingredients, pasturization of emulsion, homogenization and cooling.

The above dairy substitutes were evaluated in the following coffee solutions:

| Coffee Solution Ingredients | Formula I Grams | Formula II Grams |
|---|---|---|
| Instant coffee | 4.0 | 4.0 |
| Sugar | 10.0 | 10.0 |
| Boiling water | 211.0 | 211.0 |
| Filled cream | 15.0 | — |
| Imitation cream | — | 15.0 |
| | 240.0 | 240.0 |

Comparison of the color and flavor qualities of the coffee solution II with that of coffee solution I indicated a closer resemblance.

EXAMPLE XXXI

French salad dressing contains from 50 to 65% of vegetable oil. An example of a typical standard French Dressing is given in Formula I. Contrary to this, Formula II is completely devoid of vegetable oil and was found to resemble the flavor, color, texture and viscosity of Formula I. Polyglucose tartrated and water were employed in place of the vegetable oil, sugar and the emulsifier.

| Salad Dressing (French type) Ingredients | Formula I % by wt. | Formula II % by wt. |
|---|---|---|
| Carboxymethylcellulose 7HOP | 0.25 | 0.25 |
| Salt | 2.25 | 2.25 |
| Paprika | 1.00 | 1.00 |
| Onion powder | 1.40 | 1.40 |
| Mustard powder | 0.40 | 0.40 |
| White pepper powder | 0.40 | 0.40 |
| Garlic powder | 0.50 | 0.50 |
| Monosodium glutamate | 1.00 | 1.00 |
| Hydrolyzed vegetable protein powder | 1.00 | 1.00 |
| White vinegar (5% Acid Strength) | 26.40 | 26.40 |
| Lemon juice | 3.00 | 3.00 |
| Tomato paste | 3.00 | 3.00 |
| Sucrose | 6.00 | — |
| Refined cottonseed oil | 53.00 | — |
| Sorbitan monostearate | 0.25 | — |
| Polyglucose tartrated | — | 37.00 |
| Water | — | 22.35 |
| 12:1 Sodium cyclamate/sodium saccharin | — | .050 |
| Totals | 100.000 | 100.000 |

If desired 0.05% of methyl L-aspartyl phenylalanine may be substituted in Formula II for the 12:1 sodium cyclamate/sodium saccharin mixture.

Examples XXXII – XLVI serve to illustrate both the fat-sparing and carbohydrate substitution effects afforded by the use of polyglucose in food compositions.

EXAMPLE XXXII

DIETETIC COOKIE FILLING

| INGREDIENTS | GRAMS |
| --- | --- |
| Modified polyglucose pdr. (200 Mesh) | 700.00 |
| Hydrogenated shortening | 209.00 |
| Vanilla extract | 0.50 |
| Dipeptide sweetener (L-aspartyl phenylalanine methyl ester) | 0.50 |
| | 910.00 |

The sweetener, vanilla extract and hydrogenated shortening were mixed in a planetary mixer. The modified polyglucose was slowly added with mixing until a cream-like texture was attained.

EXAMPLE XXXIII

DIETETIC CHOCOLATE COATING

| INGREDIENTS | GRAMS |
| --- | --- |
| Cocoa powder | 114.840 |
| Modified polyglucose pdr. | 623.380 |
| Dipeptide sweetener (L-aspartyl phenylalanine methyl ester) | 5.000 |
| Vanillin | 0.940 |
| Propenyl guaethol | 0.040 |
| Cinnamic aldehyde | 0.008 |
| Anise oil U.S.P. | 0.006 |
| Benzaldehyde | 0.006 |
| Coconut oil (Hydrogenated 96–98°F.) | 253.780 |
| Lecithin | 2.000 |
| | 1,000.000 |

The cocoa powder and modified polyglucose were mixed and then passed through a 200 mesh screen.

In a separate beaker the hydrogenated coconut oil was melted on a steam bath. The lecithin, vanillin, propenyl guaethol, cinnamic aldehyde, anise oil and benzaldehyde were then added and stirred into solution. The mixture of cocoa powder and polyglucose was then added and the whole mixture was worked at 60°C. for 2 hours. The sweetener was then added with stirring. The mixture was then removed from the heat and blended in a Waring Blendor. The mixture was then cast into a mold and allowed to solidity.

EXAMPLE XXXIV

DIETETIC CARAMEL FROSTING

| INGREDIENTS | GRAMS |
| --- | --- |
| Modified polyglucose neutral form 70% solution | 100.00 |
| Skim milk powder | 6.00 |
| (Vegetable Fat) Shortening | 15.00 |
| Gelatin 250 bloom | 2.00 |
| Egg white solids | 4.00 |
| Water | 21.20 |
| Caramel flavor | 0.30 |
| Dipeptide sweetener (L-aspartyl phenylalanine methyl ester) | 1.50 |
| | 150.00 |

The required amount of water was divided into two equal parts. One part was brought to boiling at which point the gelatin was added and stirred into solution. To the other unheated portion of water was added egg white solids, which was then blended. When the gelatin solution cooled to warm temperature, the egg white solution was added and blended.

The skim milk powder and shortening were blended and set aside. The polyglucose solution was heated to 80°C. The egg white/gelatin mixture was then added and blended thoroughly. The sweetener was then added and dissolved. The milk/shortening mixture was then added in three portions over a 5 minute period using a beater. The mixture was then heated for another 25 minutes until frothy, producing a very acceptable frosting.

EXAMPLE XXXV

DIETETIC WHIPPED TOPPING

| INGREDIENTS | GRAMS |
| --- | --- |
| Hydrogenated coconut oil 96–98°F. | 15.00 |
| Sodium caseinate | 1.25 |
| 4% Aqueous solution carboxymethylcellulose-(7HOF) | 5.00 |
| Vanilla flavor, 20 fold | 0.15 |
| Non-fat milk solid | 1.25 |
| Imitation sour cream flavor | 0.10 |
| Glycerol monostearate (polysorbate 20) | 0.75 |
| Disodium phosphate | 0.02 |
| Modified polyglucose pdr. | 23.50 |
| Water 80°C. | 52.98 |
| | 100.00 |

The sodium caseinate, polyglucose, non-fat milk solids and disodium phosphate were dissolved in 80°C. water. To this was added with stirring the coconut oil, glycerol monostearate (polysorbate 20), the carboxymethylcellulose solution and flavors. The mixture was Pasteurized at 74°C. for 30 minutes, homogenized at 1,000/500 psi, cooled to 5°C. and stored at this temperature for 18 hours. The mixture was then whipped in a high speed mixer for 8 minutes.

EXAMPLE XXXVI

DIETETIC ITALIAN SALAD DRESSING

| INGREDIENTS | GRAMS |
| --- | --- |
| Dry mustard | 0.057 |
| Ground dehydrated parsley | 0.020 |
| Ground minced garlic | 0.680 |
| Ground minced onions | 0.440 |
| Dehydrated red bell peppers | 0.143 |
| Sodium saccharin | 0.004 |
| Ground black pepper | 0.430 |
| Salt | 0.500 |
| Ground white pepper | 0.143 |
| Citric acid | 0.643 |
| Monosodium glutamate | 0.530 |
| Vinegar (white distilled 5% acetic acid) | 25.000 |
| Modified polyglucose, neutralized, 70% | 71.41 |
| | 100.000 |

All the dry ingredients were hydrated in the vinegar for 1 hour. The polyglucose was then added and the mixture was shaken vigorously.

EXAMPLE XXXVII

DIETETIC SALAD DRESSING (FRENCH TYPE)

| INGREDIENTS | GRAMS |
| --- | --- |
| Carboxymethylcellulose-(7HOF) | 0.25 |
| Salt | 2.25 |
| Paprika | 1.00 |
| Onion powder | 1.40 |
| Mustard powder | 0.40 |
| White pepper powder | 0.40 |
| Garlic powder | 0.50 |
| Monosodium glutamate | 1.00 |
| Hydrolyzed vegetable protein powder | 1.00 |

-Continued

| INGREDIENTS | GRAMS |
|---|---|
| White vinegar (5% acid strength) | 26.40 |
| Lemon juice | 3.00 |
| Tomato paste | 3.00 |
| Sodium saccharin | 0.01 |
| Modified polyglucose, powder | 37.00 |
| Water | 22.39 |
| | 100.00 |

All the dry ingredients were dry blended. To this was added the polyglucose with agitation. As soon as these ingredients were dispersed and hydrated, the lemon juice, vinegar and tomato sauce were added and blended until a homogeneous mix was produced.

EXAMPLE XXXVIII

DIETETIC BARBECUE SAUCE

| INGREDIENTS | GRAMS |
|---|---|
| Tomato powder | 7.50 |
| Carboxymethylcellulose-(7HOF) | 0.50 |
| White vinegar (5% Distilled) | 28.00 |
| Salt | 4.00 |
| Mustard powder | 0.50 |
| Soy sauce | 4.00 |
| Sherry wine (20% Alcohol) | 4.00 |
| Onion powder | 0.50 |
| Paprika | 0.20 |
| Curry powder | 0.10 |
| Garlic powder | 0.50 |
| White pepper | 0.15 |
| Sodium saccharin | 0.10 |
| Modified polyglucose, powder | 34.00 |
| Monosodium glutamate | 1.00 |
| Oregano (ground) | 0.10 |
| Hickory smoke extract | 1.00 |
| Water | 63.85 |
| | 150.00 |

The carboxymethylcellulose was hydrated in water. The spices were then hydrated in the vinegar. Both solutions and remaining ingredients were added to a blender and blended for 3 minutes.

EXAMPLE XXXIX

DIETETIC BEEF GRAVY MIX

| INGREDIENTS | GRAMS |
|---|---|
| Monosodium glutamate | 2.00 |
| Salt | 2.00 |
| Beef paste | 8.00 |
| Onion powder | 0.30 |
| Black pepper | 0.20 |
| White pepper | 0.05 |
| Celery salt | 0.10 |
| Autolyzed yeast extract | 0.25 |
| Garlic powder | 0.05 |
| Gum guar | 1.00 |
| Carageneenan | 0.50 |
| Powdered texturized vegetable protein | 2.00 |
| Powdered skim milk | 5.00 |
| All purpose flour | 8.00 |
| Hydrolyzed vegetable protein | 5.80 |
| Modified polyglucose, neutralized powder | 64.75 |
| | 100.00 |

The beef paste, hydrolyzed vegetable protein, yeast, salt, celery salt, monosodium glutamate and skim milk were blended until a homogeneous mixture was attained. The flour was added to this with mixing. The texturized vegetable protein, onion powder, peppers, garlic powder, gum guar and carageneenan were then blended in. To this the polyglucose was slowly added with blending. The resultant mixture was then blended in a Waring Blendor.

20–25 grams of this mixture added to 100 ml of water which is heated on a low flame with stirring and then brought to a boil produces a satisfactory beef gravy.

EXAMPLE XL

DIETETIC BUTTERSCOTCH FLAVORED IMITATION ICE CREAM

| INGREDIENTS | GRAMS |
|---|---|
| Heavy cream (35% butterfat content) | 7.00 |
| Non-fat milk solids | 10.00 |
| Synthetic butterscotch flavor | 0.10 |
| Mono and diglyceride emulsifier | 0.20 |
| Bleached, neutralized, 70% aqueous solution modified polyglucose | 28.70 |
| Gelatin 150 bloom | 0.40 |
| Sodium saccharin | 0.05 |
| Water | 53.55 |
| | 100.00 |

The polyglucose, non-fat milk solids, gelatin, heavy cream, emulsifier and water were mixed in a 1,000 ml flask. A two-necked cover fitted with a thermometer and stirrer was attached and the flasks was then placed in a heating mantle. The mix was then Pasteurized at 74°C. for 30 minutes. The sodium saccharin and flavor were added with stirring to the hot mix. The mix was then homogenized at 1,000 psi and then at 500 psi, and cooled immediately to 5°C. It was then aged for 18–24 hours at 5°C., frozen and stored according to commercial practice.

A comparable product is also obtained using L-asparatyl phenylalanine methyl ester instead of sodium saccharin at the same concentration level.

EXAMPLE XLI

DIETETIC VANILLA PUDDING

| INGREDIENTS | GRAMS |
|---|---|
| Water | 69.68 |
| Non-fat milk solids | 8.00 |
| Dipeptide sweetener (L-aspartyl phenylalanine methyl ester) | 0.06 |
| Modified polyglucose, neutralized 70% solution | 20.00 |
| Glycerol monostearate | 0.02 |
| Propylene glycol monostearate | 0.04 |
| Corn starch | 2.00 |
| Carageneenan | 0.15 |
| Vanilla extract sweet cream flavor | 0.05 |
| | 100.00 |

The skim milk was dissolved in water, followed by the addition of the rest of the ingredients with blending. The mixture was then cooked over medium heat until it comes to a full boil. The L-aspartyl phenylalnine methyl ester sweetener was then added and mixed in. The mixture was then poured into serving dishes and refrigerated.

EXAMPLE XLII

DIETETIC BLEU CHEESE DRESSING

| INGREDIENTS | GRAMS |
| --- | --- |
| Modified polyglucose 70% aqueous solution, neutralized | 45.00 |
| Hi acid buttermilk pwdr | 2.00 |
| Carrageenan | 0.75 |
| Bleu cheese pwdr | 9.00 |
| Vinegar (5% white distilled) | 15.00 |
| Garlic powder | 0.30 |
| Onion powder | 0.30 |
| Parsley flakes | 0.25 |
| Celery salt | 0.05 |
| Worcestershire sauce | 0.50 |
| Monosodium glutamate | 1.00 |
| Salt | 0.30 |
| Water | 22.55 |
| | 100.00 |

The carageneenan was hydrated in the water using a Waring Blender. The other ingredients were then added and mixed in. The mixture was then homogenized at 1,500 psi.

EXAMPLE XLIII

DIETETIC MAYONNAISE

| INGREDIENTS | GRAMS |
| --- | --- |
| Modified polyglucose, neutralized (70% aqueous solution) | 37.500 |
| Modified tapioca starch (instant) | 4.000 |
| Rapid set pectin | 1.875 |
| Water 25°C. | 12.500 |
| Salt | 1.750 |
| Sodium benzoate | 0.040 |
| Dry mustard | 0.600 |
| Sodium saccharin | 0.005 |
| Dehydrated lemon juice | 0.600 |
| Egg yolk | 7.500 |
| Vinegar | 10.000 |
| Corn oil | 10.000 |
| Water | 13.630 |
| | 100.000 |

The starch was hydrated in the modified polyglucose solution and the pectin in 12.5 gm. of water (25°C.). Both hydrated solutions were then combined and mixed. The resultant gel was transferred to a food mixer equipped with a double paddle and to this was added the salt, mustard, sodium benzoate, saccharin and dehydrated lemon juice. The mixture was beat for 3–5 minutes followed by the addition of the egg yolk, which was then beat for an additional 5–10 minutes until a light, fluffy mass was attained. The vinegar was then added with beating, followed by the oil and then the remaining water. Beating was continued until a uniform product resulted.

EXAMPLE XLIV

DIETETIC CHOCOLATE FLAVORED MILK SHAKE

| INGREDIENTS | GRAMS |
| --- | --- |
| Modified polyglucose type N (powder) | 35.13 |
| Cocoa powder | 3.80 |
| Vanillin | 0.30 |
| Imitation heavy cream | 9.70 |
| Chocolate flavor | 1.00 |
| Sodium saccharin | 0.07 |
| Skim milk | 150.00 |
| | 200.00 |

All the ingredients with the exception of the skim milk were mixed and blended. The blend was then added to the skim milk and blended using a Waring Blendor.

Comparable results are obtained using L-aspartyl phenylalanine methyl ester instead of sodium saccharin.

EXAMPLE XLV

DIETETIC CHOCOLATE TOPPING (FUDGE TYPE)

| INGREDIENTS | GRAMS |
| --- | --- |
| Modified polyglucose, 70% aqueous solution | 83.25 |
| Imitation cream (powdered) | 8.25 |
| L-aspartyl phenylalanine methyl ester | 0.50 |
| Cocoa powder 10/12% fat | 5.00 |
| Cacao liquor | 3.00 |
| | 100.00 |

The modified polyglucose, imitation cream and L-aspartyl phenylalanine methyl ester were mixed and heated to 80°C. The cocoa flavors were then added and the mixture reheated to 90°C., followed by homogenization at 1,500 psi.

EXAMPLE XLVI

DIETETIC LEMON LIME FLAVORED COOKIES

| INGREDIENTS | GRAMS |
| --- | --- |
| Non-fat milk solids | 5.8 |
| Emulsified vegetable shortening | 90.0 |
| Whole eggs (beaten) | 22.8 |
| Water | 104.6 |
| Enriched flour (bleached) | 127.5 |
| Sodium bicarbonate | 0.50 |
| Glucono delta lactone | 1.0 |
| Sodium saccharin | 0.5 |
| Lemon-lime flavor three fold (imitation) | 0.1 |
| Modified polyglucose, powder | 136.2 |
| Microcrystalline cellulose | 42.5 |
| | 531.5 |

A mixture of polyglucose, non-fat milk solids and emulsified shortening were creamed in a high speed mixer for 5 minutes. The eggs were then added and mixed for 1 minute. The saccharin and flavor were dissolved in water and added to the mixture. The flour, sodium bicarbonate, glucono delta lactone and microcrystalline cellulose were then added and mixed for 3 minutes. The cookie dough was then dropped on a pre-greased cookie sheet, spacing about 1½ inches apart and baked at 375°F. for 15–20 minutes.

What is claimed is:

1. A foodstuff containing a water-soluble highly-branched polyglucose wherein the linkage of 1 → 6 predominates, having a number average molecular weight between about 1,500 and 18,000 and containing from about 0.5 to 5 mole percent of polycarboxylic acid ester groups wherein the acid is selected from the group consisting of citric, fumaric, tartaric, succinic, adipic, itaconic and malic acids.

2. A foodstuff containing a water-soluble highly-branched polyglucose wherein the linkage of 1 → 6 predominates, having a number average molecular weight between about 1,500 and 18,000 and containing (a) from about 0.5 to 5 mole percent of polycarboxylic acid ester groups wherein the acid is selected from the group consisting of citric, fumaric, tartaric, succinic, adipic, itaconic and malic acids and (b) from about 5 to 20% by weight of a food-acceptable polyol selected from the group consisting of sorbitol, glycerol, erythritol, xylitol, mannitol, and galactitol which is chemically bonded thereto.

3. Dry low-calorie sweetener composition containing at least 50% by weight of a water-soluble highly-branched polyglucose wherein the linkage of 1 → 6 predominates, having a number average molecular weight between about 1,500 and 18,000 and containing (a) from about 0.5 to 5 mole percent of polycarboxylic acid ester groups wherein the acid is selected from the group consisting of citric, fumaric, tartaric, succinic, adipic, itaconic and malic acids and (b) as the balance at least one sweetener selected from the group consisting of saccharine, L-aspartyl-L-phenylalanine methyl ester, fructose, neohesperidine dihydrochalcone, N'-acetylkynurenine and N'-formylkynurenine.

4. In a method for producing dietetic foods, the improvement which comprises substituting a water-insoluble polyglucose wherein the linkage 1 → 6 predominates, having a number average molecular weight between about 6,000 and 36,000 and containing from about 2.5 to 10 mole percent of polycarboxylic acid ester cross-linkages wherein the acid is selected from the group consisting of citric, fumaric, tartaric, succinic, adipic, itaconic and malic acids for at least part of the flour or other starchy material ordinarily contained therein.

5. A dietetic food composition comprising a fatty-triglyceride-containing food wherein at least part of said triglyceride ordinarily contained therein is replaced by a water-soluble highly-branced polyglucose wherein the 1 → 6 linkage predominates, said polyglucose having a number average molecular weight between about 1,500 and 18,000 and containing from about 0.5 to 5 mole percent polycarboxylic acid ester groups wherein the acid is selected from the group consisting of citric, fumaric, tartaric, succinic, adipic, itaconic and malic acids.

6. The composition of claim 5 wherein said polyglucose additionally contains from about 5 to 20% by weight of sorbitol chemically bonded thereto.

7. The composition of claim 5 wherein said acid is citric acid.

8. A dietetic food composition comprising a fatty-triglyceride- and carbohydrate- containing food wherein at least part of said triglyceride and said carbohydrate ordinarily contained therein are replaced by a water-soluble highly-branched polyglucose wherein the 1 6 linkage predominates, said polyglucose having a number average molecular weight between about 1,500 and 18,000 and containing from about 0.5 to 5 mole percent polycarboxylic acid ester groups wherein the acid is selected from the group consisting of citric, fumaric, tartaric, succinic, itaconic and malic acids.

9. The composition of claim 8 wherein said polyglucose additionally contains from about 5 to 20% by weight of sorbitol chemically bonded thereto.

10. The composition of claim 8 wherein said acid is citric acid.

11. The composition of claim 9 wherein at least part of said triglyceride and substantially all of said carbohydrate ordinarily contained therein are replaced by said water-soluble highly-branched polyglucose.

12. The compositon of claim 9 in dessert form containing from about 0.2 to 1.0 part by weight of said polyglucose per part by weight of said triglyceride plus said carbohydrate replaced.

13. The composition of claim 12 also containing a sweetening amount of L-aspartyl-L-phenylalanine methyl ester.

14. The composition of claim 9 in garnish form containing from about 0.3 to 3 parts by weight of said polyglucose per part by weight of said triglyceride plus said carbohydrate replaced.

15. The composition of claim 9 in confection form containing from about 0.3 to 1.5 part by weight of said polyglucose per part by weight of said triglyceride plus said carbohydrate replaced.

16. The composition of claim 15 also containing a sweetening amount of L-aspartyl-L-phenylalanine methyl ester.

17. The composition of claim 9 in leavened baked form containing from about 1.25 to 1.5 part by weight of said polyglucose per part by weight of said triglyceride plus said carbohydrate replaced.

18. The composition of claim 17 also containing a sweetening amount of L-aspartyl-L-phenylalanine methyl ester.

* * * * *